United States Patent [19]

Kato

[11] Patent Number: 5,007,164
[45] Date of Patent: Apr. 16, 1991

[54] METHOD AND APPARATUS FOR PRODUCING LINEAR BODY WITH WATERPROOF PLUG

[75] Inventor: Sanae Kato, Gotenba, Japan

[73] Assignee: Yazaki Corporation, Tokyo, Japan

[21] Appl. No.: 404,534

[22] Filed: Sep. 8, 1989

[30] Foreign Application Priority Data

Sep. 12, 1988 [JP] Japan .................................. 63-226394

[51] Int. Cl.$^5$ ............................................. B23P 19/00
[52] U.S. Cl. ....................................... 29/854; 29/433; 29/450; 29/809; 29/759; 29/235; 29/241
[58] Field of Search ................ 29/854, 857, 433, 809, 29/810, 235, 241, 450, 745, 759, 760, 729

[56] References Cited

U.S. PATENT DOCUMENTS 4,653,182 3/1987 Fukuda et al. ..................... 29/809 X

FOREIGN PATENT DOCUMENTS

48201 1/1982 Japan .................................... 29/809

Primary Examiner—Timothy V. Eley
Attorney, Agent, or Firm—Armstrong, Nikaido, Marmelstein, Kubovcik & Murray

[57] ABSTRACT

A method for mounting a waterproof plug to the front end of a covered electric wire, comprising the steps of feeding waterproof plugs to a first position of a transfer path one by one from a magazine in such a manner that the opening of each waterproof plug is in parallel with the transfer path; feeding a covered electric wire to a mounting position as a second position of the transfer path in an uncovered state of the front end thereof; and transferring the waterproof plug from the first position to the second position and inserting the uncovered end of the electric wire into the opening of the waterproof plug. Also disclosed is an apparatus for mounting a waterproof plug to the front end of a covered electric wire, including means for feeding waterproof plugs to a first position of a transfer path one by one in such a manner that the opening of each waterproof plug is in parallel with the transfer path; means for feeding a covered electric wire to a mounting position as a second position of the transfer path in an uncovered state of the front end thereof; and means for transferring the waterproof plug from the first position to the second position and inserting and clamping the uncovered end of the electric wire into the opening of the waterproof plug.

19 Claims, 13 Drawing Sheets

METHOD AND APPARATUS FOR PRODUCING LINEAR BODY WITH WATERPROOF PLUG

BACKGROUND OF THE INVENTION

1. Field of the Invention

The present invention relates to a linear body such as an electric wire for use in a waterproof type connector, etc. Particularly, the present invention is concerned with a method and apparatus for producing a linear body with a waterproof plug mounted at the front end thereof.

2. Description of the Prior Art:

In a connection the coating of such as a connector, an electric wire or the like used in various electric wirings is peeled off at the front end thereof and is then connected to a terminal fitting, so its conductor portion is exposed to the exterior. In some particular place, therefore, there occurs moisture condensation due to changes in temperature, which may lead to poor insulation and the resulting trouble. To prevent the entry of water drops, there is provided a waterproof plug in the connection between the electric wire and the connector.

Figure 14:
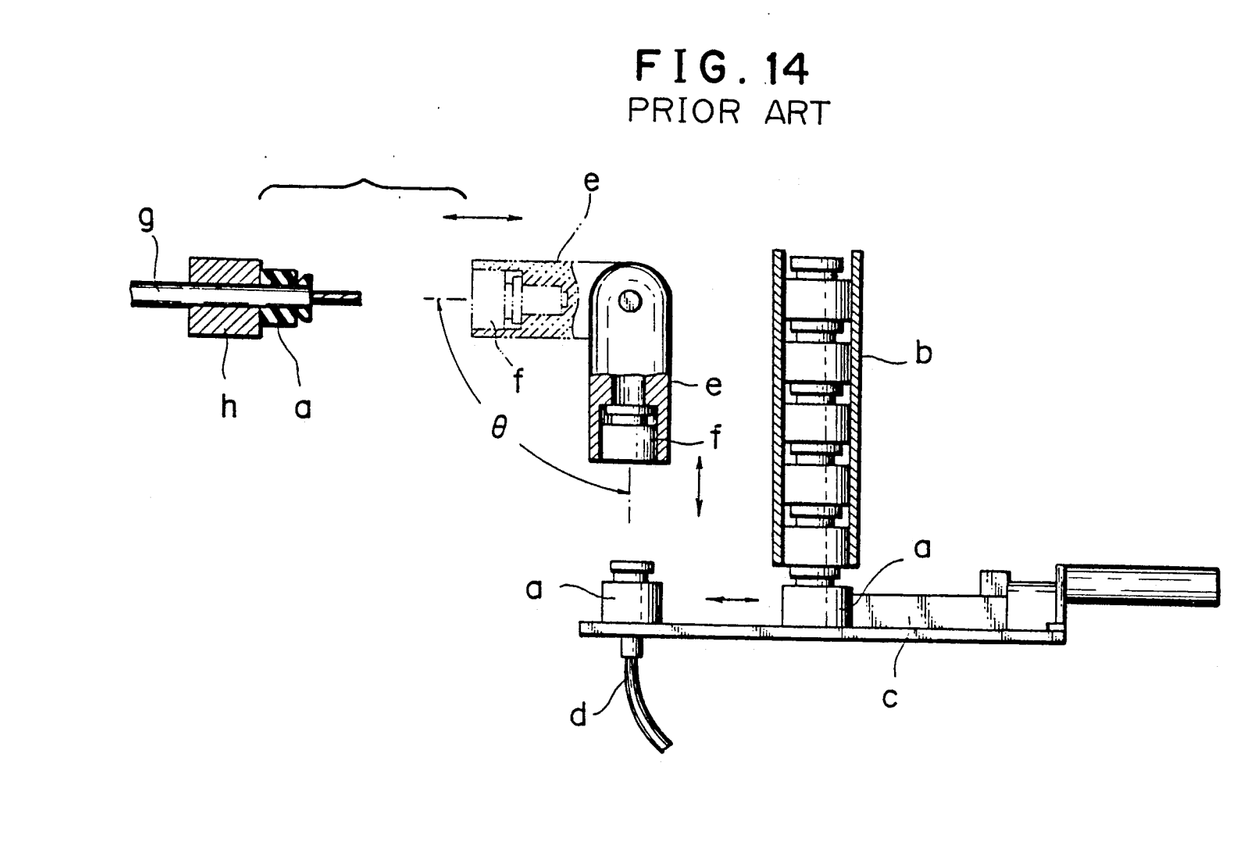
FIG. 14 is a construction diagram of the prior art.

FIG. 14 illustrates an apparatus for mounting such waterproof plug to the front end of an electric wire, which apparatus is disclosed in Japanese Utility Model Laid-Open No. 111318/85.

In FIG. 14, waterproof plugs a are fed continuously from a magazine b. They are forwarded one by one by a reciprocating motion of a pusher c. The reference mark d denotes a vacuum hose which fixes the waterproof plug a in a predetermined position on a table. An insertion head e is formed with a hole f for insertion therein of each waterproof plug a; it is movable vertically and transversely and pivotable at an angle of $\theta$ in the same figure. On the other hand, on the left-hand side of the insertion head e, an electric wire g is held by a clamp h so that the axis thereof is aligned with that of the insertion head e when the insertion head has turned leftwards.

For mounting the waterproof plug a to the front end of the electric wire g, first one waterproof plug a is delivered from the magazine b by means of the pusher c and is fixed in a predetermined position on the table by means of the vacuum hose d. Then, the insertion head e goes down until the waterproof plug a is fitted and held in the hole f, whereupon the insertion head moves back to its original upper position, then turns at an angle of $\theta$ and faces to the left. Subsequently, the insertion head e moves leftwards to mount the waterproof plug a onto the front end of the electric wire g. When the insertion head e returns to its original position, the waterproof plug a remains on the electric wire g and is thereby mounted because its fitting with the electric wire g is stronger than that with the hole f.

In the above conventional technique, however, the insertion head e is required to not only pivot but also move vertically and transversely, resulting in that the structure is complicated and it is impossible to the operation.

SUMMARY OF THE INVENTION

The present invention has been accomplished in view of the above facts and it is the object thereof to provide a method and apparatus for producing a linear body with a waterproof plug which permit high-speed operations.

According to the present invention, in order to achieve the above-mentioned object there is provided a method for producing a linear body with a waterproof plug, comprising the steps of feeding waterproof plugs to a first position of a transfer path one by one from a magazine in such a manner that the opening of each waterproof plug is in parallel with the transfer path; feeding a covered electric wire to a mounting position at a second position of the transfer path in an uncovered state of the front end thereof; and transferring the waterproof plug from the first to the second position and inserting the uncovered end of the electric wire into the opening of the waterproof plug.

Also, according to the present invention, in order to achieve the foregoing object there is provided an apparatus for mounting a waterproof plug to the front end of a covered electric wire, including means for feeding waterproof plugs to a first position of a transfer path one by one in such a manner that the opening of each waterproof plug is in parallel with the transfer path; means for feeding a covered electric wire to a mounting position at a second position of the transfer path in an uncovered state of the front end thereof; and means for transferring the waterproof plug from the first to the second position and inserting and clamping the uncovered end of the electric wire into the opening of the waterproof plug.

DESCRIPTION OF THE PREFERRED EMBODIMENTS:

Embodiments of the present invention will be described hereinunder with reference to the accompanying drawings.

Figure 1:
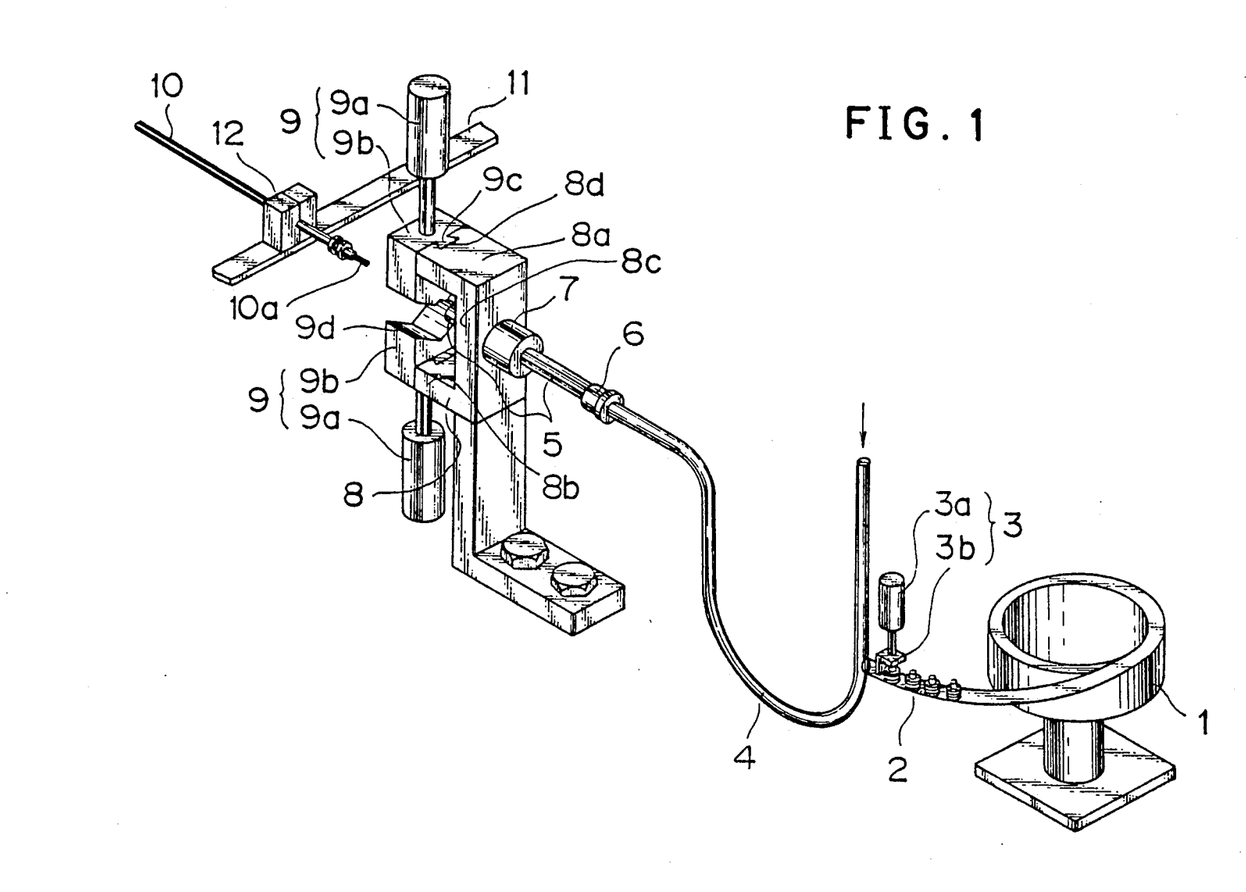
FIG. 1 is a perspective view showing the construction of an apparatus for producing a linear body with a waterproof plug according to an embodiment of the present invention.

Referring first to FIG. 1, there is schematically illustrated an apparatus for mounting a waterproof plug to a covered electric wire having an uncovered front end according to the present invention. In FIG. 1, the numeral 1 denotes a parts feeder serving as a waterproof plug feed means and mounted on the floor for example, whereby waterproof plugs 2 are fed in the same direction by virtue of, for example, vibration. Numeral 3 denotes a waterproof plug dispenser for feeding the waterproof plugs 2 one by one to an air transfer device 4, the waterproof plug dispenser 3 comprising a cylinder 3a fixed to an underframe (not shown) of the apparatus and a partition plate 3b fixed to the front end of the rod of the cylinder 3a. The air transfer device 4 comprises a flexible air hose and a compressor (not shown) and functions to convey each waterproof plug 2 by passing a high-pressure air (about 4 kgf/cm$^2$) through the air hose at a desired timing. Numeral 5 denotes a guide nozzle constituted by a rigid, hollow pipe, the guide nozzle 5 being connected to the air transfer device 4 through an air coupling 6. Numeral 7 denotes a guide nozzle actuating cylinder fitted on the guide nozzle 5 to move the guide nozzle forward and backward. Numeral 8 denotes a C-shaped support fixed to an underframe (not shown), the support 8 comprising two upper and lower arms 8a, 8b and a vertical connection 8c which connects both arms together. To the outer surface of the connection 8c there is fixed the guide nozzle actuating cylinder 7. Further, a through hole 8e and an opening of the cylinder 7 aligned with the through hole 8e are formed to permit sliding therethrough of the guide nozzle 5. At the free ends of the arms 8a and 8b there are mounted linear body gripping means 9 opposed vertically to each other, the gripper portions 9 comprising a pair of air cylinders 9a and a pair of chuck portions 9b mounted on the front ends of the piston rods of the air cylinders 9a, the chuck portions 9b each having a drive shaft perpendicular to the drive shaft of the guide nozzle 5. The chucks 9b grip an electric wire by V grooves 9d formed at the front ends thereof. Numeral 10 denotes an electric wire as a linear body. The coating at the front end of the electric wire is peeled off in advance to expose a core 10a thereof. In this state the electric wire is fed to the apparatus of this embodiment while being held by a holder means 12 fixed to a conveyor 11 which is provided separately from the apparatus of this embodiment. The electric wire is thus held by the holder means 12, but since the distance up to the guide nozzle 5 is long, the front end of the electric wire is apt to hang down and it is difficult to effect accurate positioning thereof with respect to the guide nozzle 5. To avoid this inconvenience, there are provided the linear body gripping means 9, 9. But the gripping means 9, 9 may be omitted, allowing the holder means 12 to serve also as the gripping means.

Figure 2A:
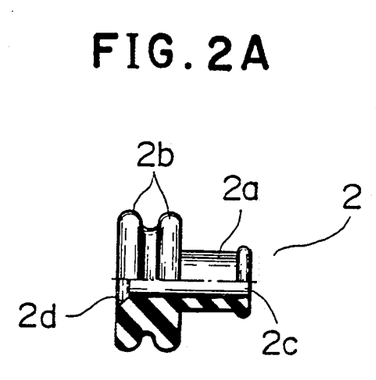
FIG. 2 is a view of a waterproof plug, in which A is a partially sectional view and B is a side view.
Figure 2B:
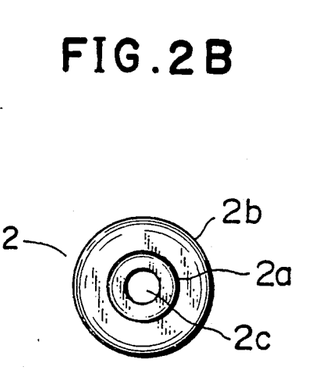

FIGS. 2A and 2B are detail views of the waterproof plug 2. The waterproof plug 2 comprises a small-diameter portion 2a on one side thereof which is to be caulked by a terminal fitting (not shown) after being fitted on the linear body 10, and a large-diameter portion 2b on the other side thereof which is formed in the shape of a double collar, serving as a waterproof seal for the gap with respect to a connector. Centrally of the waterproof plug 2 there is formed a through hole 2c for insertion therethrough of the electric wire 10. The end portion on the large-diameter side of the waterproof plug 2 is formed as a tapered, enlarged portion 2d so that the exposed core 10a and the coating of the electric wire 10 can be easily inserted into the waterproof plug.

Figure 3:
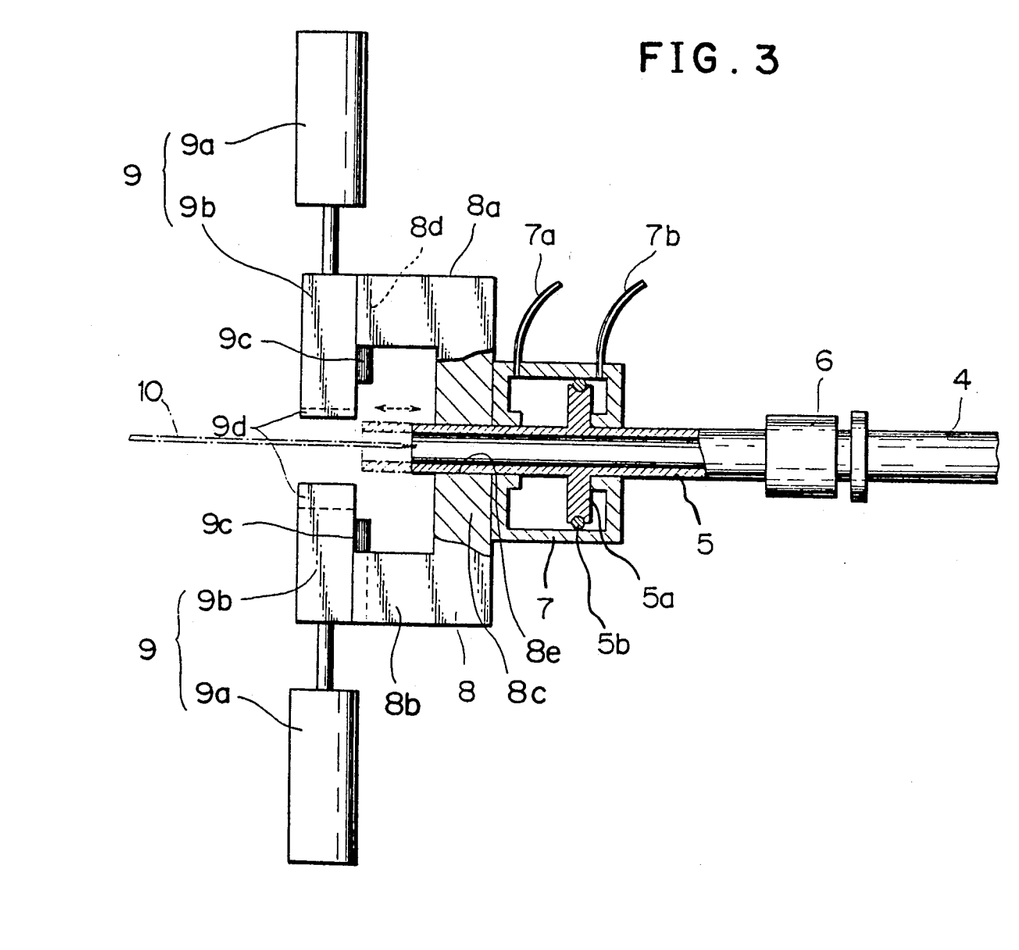
FIG. 3 is a partially cut-away view of a principal portion of the apparatus, with a guide nozzle in a retreated position.
Figure 4:
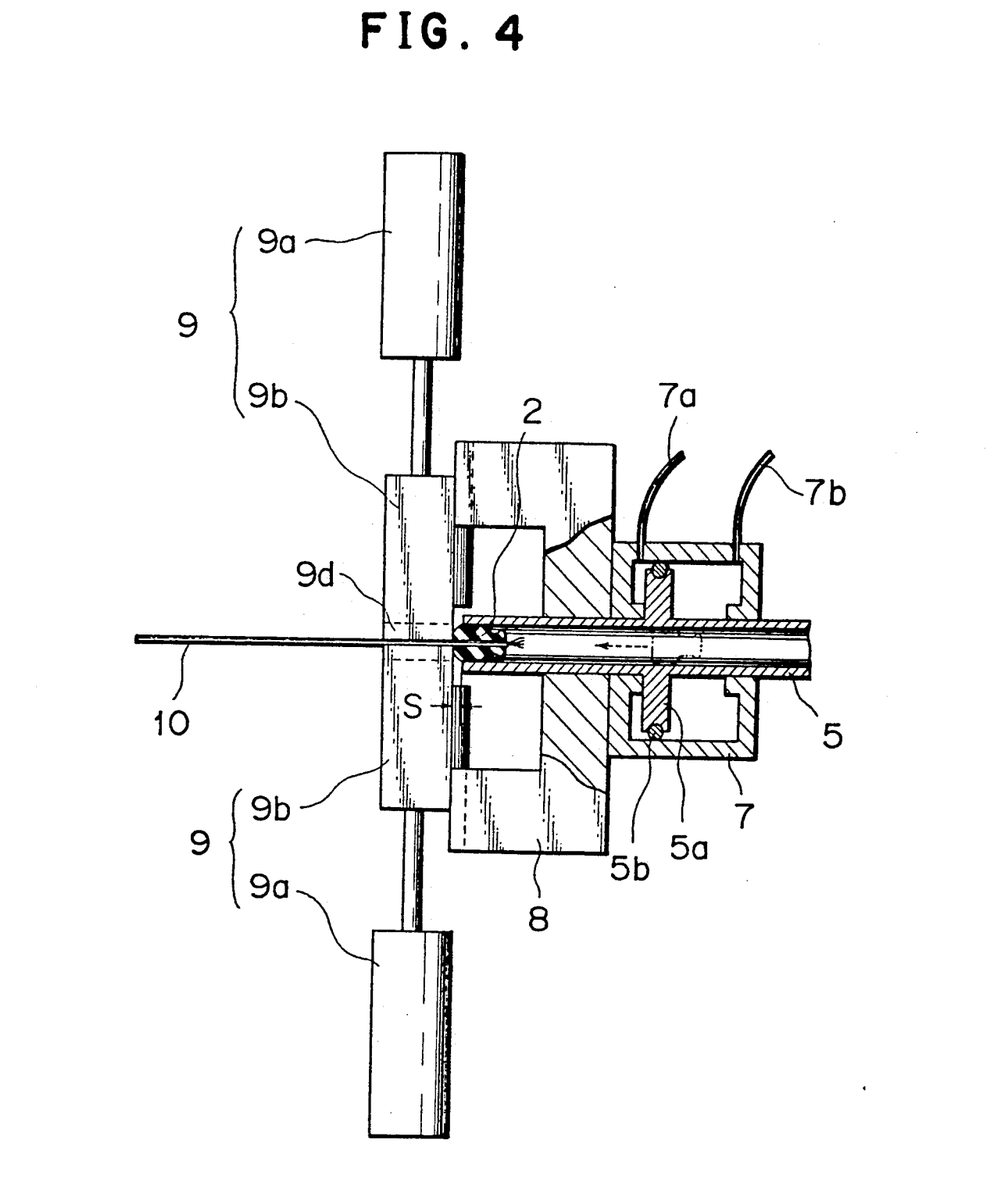
FIG. 4 is a view similar to FIG. 3, with the guide nozzle in an advanced position.

FIGS. 3 and 4 are detail views of a principal portion of the apparatus of this embodiment. The guide nozzle actuating cylinder 7 is fixed to the support 8 and the guide nozzle 5 extends through the two. The guide nozzle 5 has an integrally-formed collar 5a serving as a piston of the cylinder and a sealing ring 5b fitted in a groove formed in the outer periphery of the collar 5a, whereby the guide nozzle is slidably fitted in the cylinder in a hermetically sealed condition. To the cylinder 7 are connected air pipes 7a and 7b, which in turn are each connected to a compressor. Further, the guide nozzle 5 is connected by an air coupling 6 to a flexible air hose of the air transfer device 4. Therefore, when compressed air is fed to cylinder 7 from the air pipe 7b, the guide nozzle 5 moves to the left, while when compressed air is fed from the air pipe 7a, the guide nozzle 5 moves to the right (home position).

The linear body gripping means 9, 9 and the frame 8 are connected together slidably by, for example, dovetails 9c and dovetail grooves 8c. The chuck portions 9b are slid by the cylinders 9a and grip the electric wire 10 by the V grooves 9d formed in the front ends of the chuck portions in such a manner that the axis of the electric wire 10 is aligned with the axis of the guide nozzle.

Figure 5:
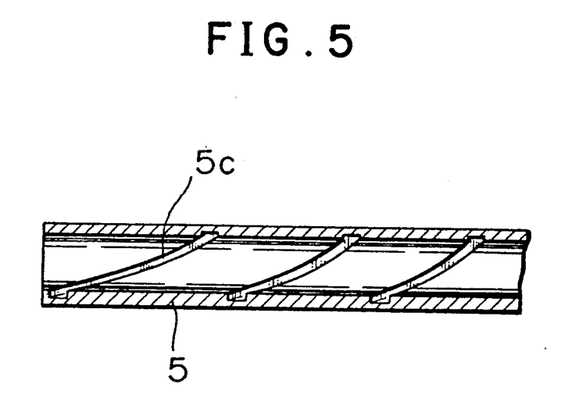
FIG. 5 is a sectional view, showing a spiral groove formed in the guide nozzle.

FIG. 5 is a view showing an example of the interior of the guide nozzle 5 illustrated in FIG. 1. The guide nozzle 5 has a spiral groove 5c formed in the inner wall thereof for imparting rotation to the waterproof plugs 2.

The operation of the embodiment illustrated in FIGS. 1 to 5 will now be described. First, in the state of FIG. 3, the electric wire 10 is gripped by the linear body gripping means 9. The front end of the electric wire 10 has been uncovered to expose the core 10a. Then, air is fed to the guide nozzle actuating cylinder 7 through the air pipe 7b, so that the guide nozzle 5 advances toward the electric wire 10 until the front end of the electric wire enters the guide nozzle 5. On the other hand, one waterproof plug 2 fed from the waterproof plug feed means 1 is delivered to the air transfer device 4 through the waterproof plug dispenser 3, whereupon a high-pressure air (about 4 kgf/cm$^2$) is fed to the air transfer device 4, so that the waterproof plug 2 flies like a bullet of an air gun through the air transfer device 4 and reaches the guide nozzle 5. The waterproof plug 2 is given rotation by the spiral groove 5c of the guide nozzle 5 and is thereby fitted on the front end portion of the electric wire as shown in FIG. 4.

In this state, the fitting force between the waterproof plug 2 and the electric wire 10 is set at a value larger than the fitting force between the waterproof plug and the guide nozzle 5. Consequently, when the guide nozzle 5 is retreated to its position shown in FIG. 3 by feeding a high-pressure air to the air pipe 7a, the waterproof plug will remain at the front end of the electric wire 10 and thus there is obtained the electric wire 10 with the waterproof plug 2 mounted at the front end thereof.

In FIG. 4, a slight gap S is formed between the guide nozzle 5 and the linear body gripping means 9 to permit the high-pressure air to escape therethrough. In place of this gap there may be formed a gap through the linear body gripping means 9 when the V grooves 9d grip the electric wire 10.

Figure 12A:
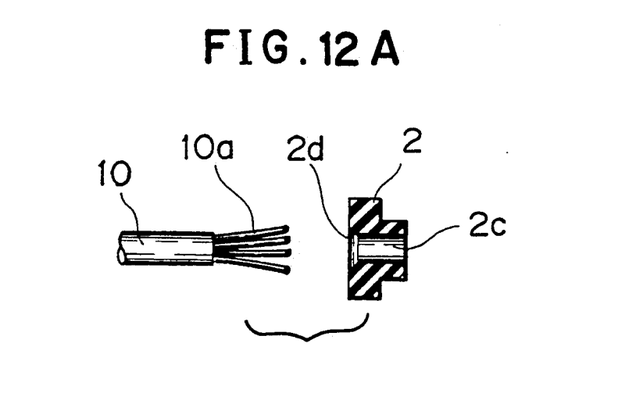
FIGS. 12A-12C are views showing linear body-waterproof plug relations.
Figure 12B:
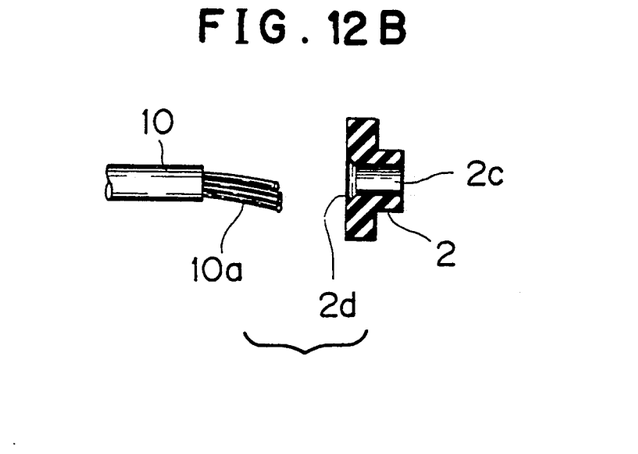
Figure 12C:
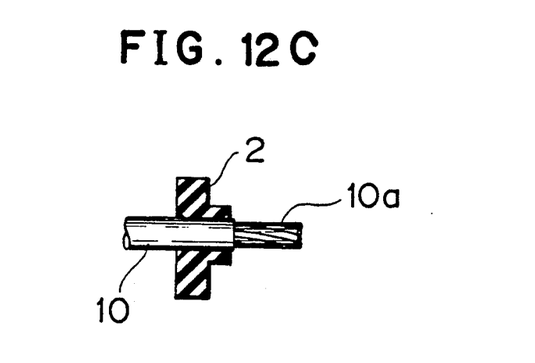

The reason for giving rotation to the waterproof plug 2 is as follows. FIG. 12 shows the relation between the front end of the electric wire 10 and the waterproof plug 2. When the electric wire 10 is gripped by the linear body gripping means 9, its core 10a may be expanded as shown in FIG. 12A, or hang down like FIG. 12B. In this case, if the waterproof plug 2 is not rotated, the core 10a will be inserted in a bent condition into the hole 2c, thus causing a defect at the time of connection with a caulking piece of a terminal (not shown). On the other hand, if the waterproof plug 2 is rotated, the core 10a will be somewhat twisted at the tapered inlet portion 2d of the hole 2c of the waterproof plug, whereby the core 10a is corrected upright as shown in FIG. 12C to eliminate a mounting error.

According to this embodiment, since the guide nozzle 5 and the parts feeder which is the waterproof plug feed means 1 are interconnected by the air transfer device 4 having a flexible hose, there is versatility with respect to the mounting positions of the two.

Figure 6:
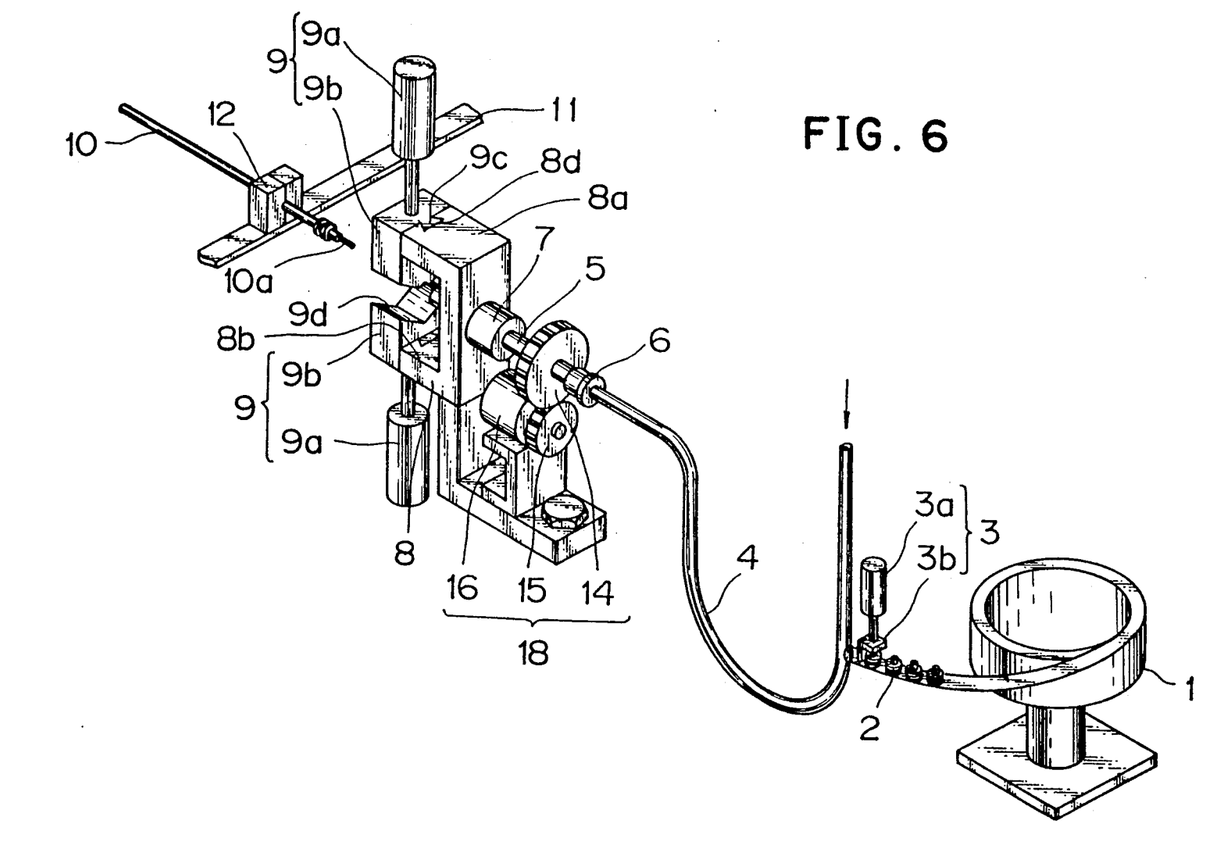
FIG. 6 is a perspective view of another embodiment of this invention.

FIG. 6 is a construction diagram of another embodiment. This embodiment is almost the same as in the embodiment of FIG. 1, so only different points will now be explained. A gear 14 is mounted on a guide nozzle 5 and is in mesh with a mating gear 15 which is driven by a motor 16, the gears 14, 15 and the motor 16 constituting a drive means 18 for the guide nozzle 5. The drive means 18 rotates the guide nozzle 5 about the axis of the nozzle to impart rotation to the waterproof plug 2.

The gear 14 is fitted on a long key 17 (FIG. 7) fixed to the guide nozzle 5, to permit sliding motion. Thus, the guide nozzle 5 can move forward and backward while rotating. Further, the guide nozzle 5 and the air transfer device 4 are connected together by a rotatable air coupling 6 in a hermetically sealed condition.

Figure 7:
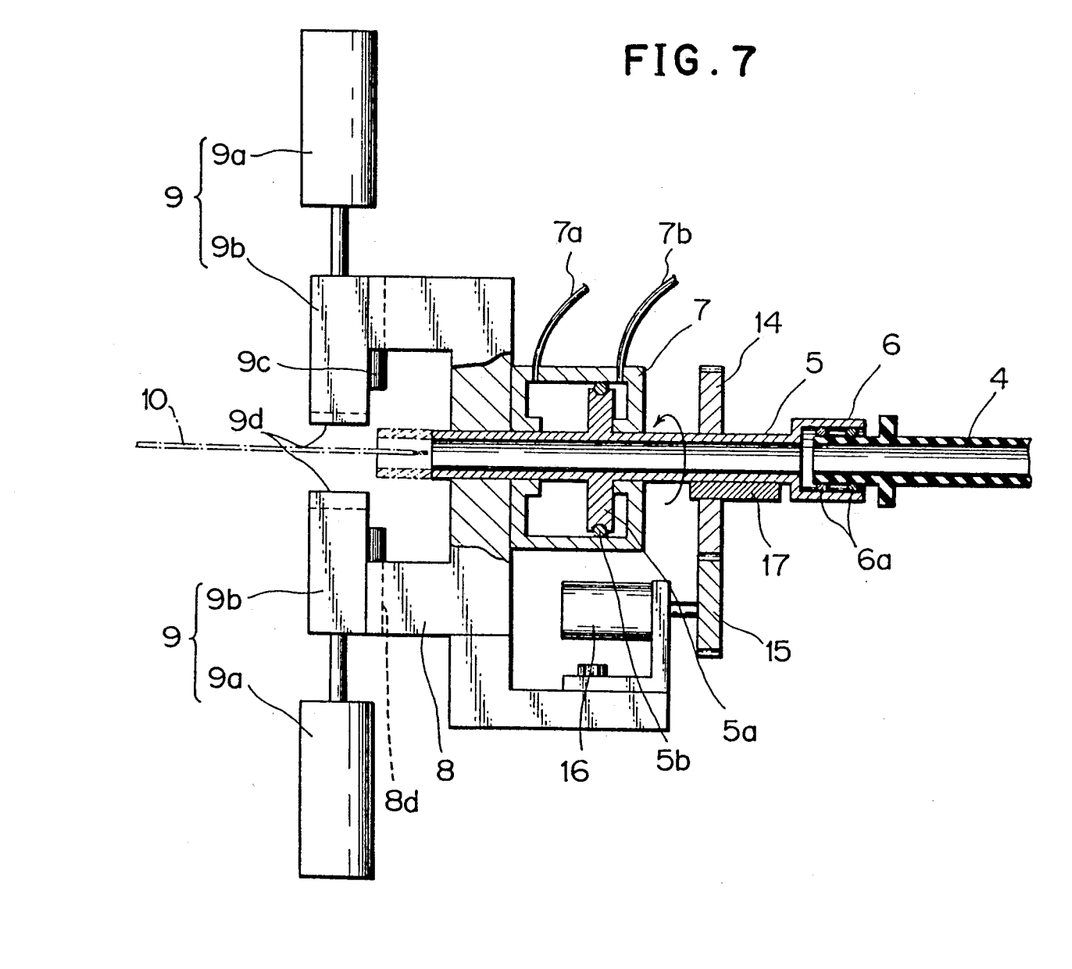
FIG. 7 is a partially cut-away view of a principal portion of the apparatus shown in FIG. 6, in the absence of a waterproof plug stopping means and with a guide nozzle in a retreated position.
Figure 8:
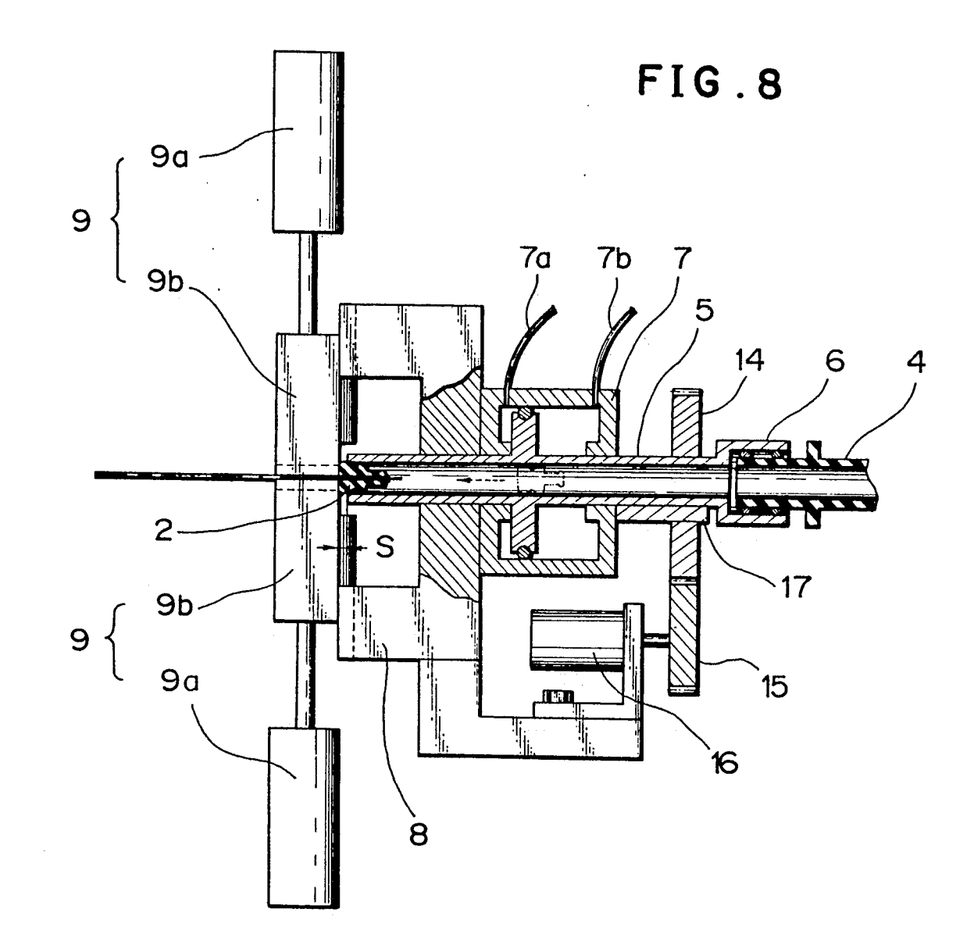
FIG. 8 is a view similar to FIG. 7, with the guide nozzle in an advanced position.

The operation of the embodiment of FIG. 6 will now be described with reference to FIGS. 7 and 8 mainly about differences from the previous embodiment. First, in the state of FIG. 7, an electric wire 10 is gripped by a linear body gripping means 9.

The guide nozzle 5 advances toward the electric wire 10 until the front end of the electric wire enters the guide nozzle. At this time, the gear 14 does not rotate. The guide nozzle 5 advances while the key 17 slides through the gear 14.

At about the same time as the wire enters the guide nozzle 5, the motor 16 is supplied with electricity, so that the gear 14 is rotated by the gear 15, causing rotation of the guide nozzle 5. The number of revolutions is about 10 to 20 rps.

On the other hand, one waterproof plug 2 fed from the waterproof plug feed means 1 is delivered to the air transfer device 4 through the waterproof plug dispenser 3, whereupon a high-pressure air is fed to the air transfer device 4, so that the waterproof plug 2 flies like a bullet of an air gun through the air transfer device 4 and the guide nozzle 5 while being given rotation by the guide nozzle and is fitted on the front end portion of the electric wire as shown in FIG. 4.

Figure 9:
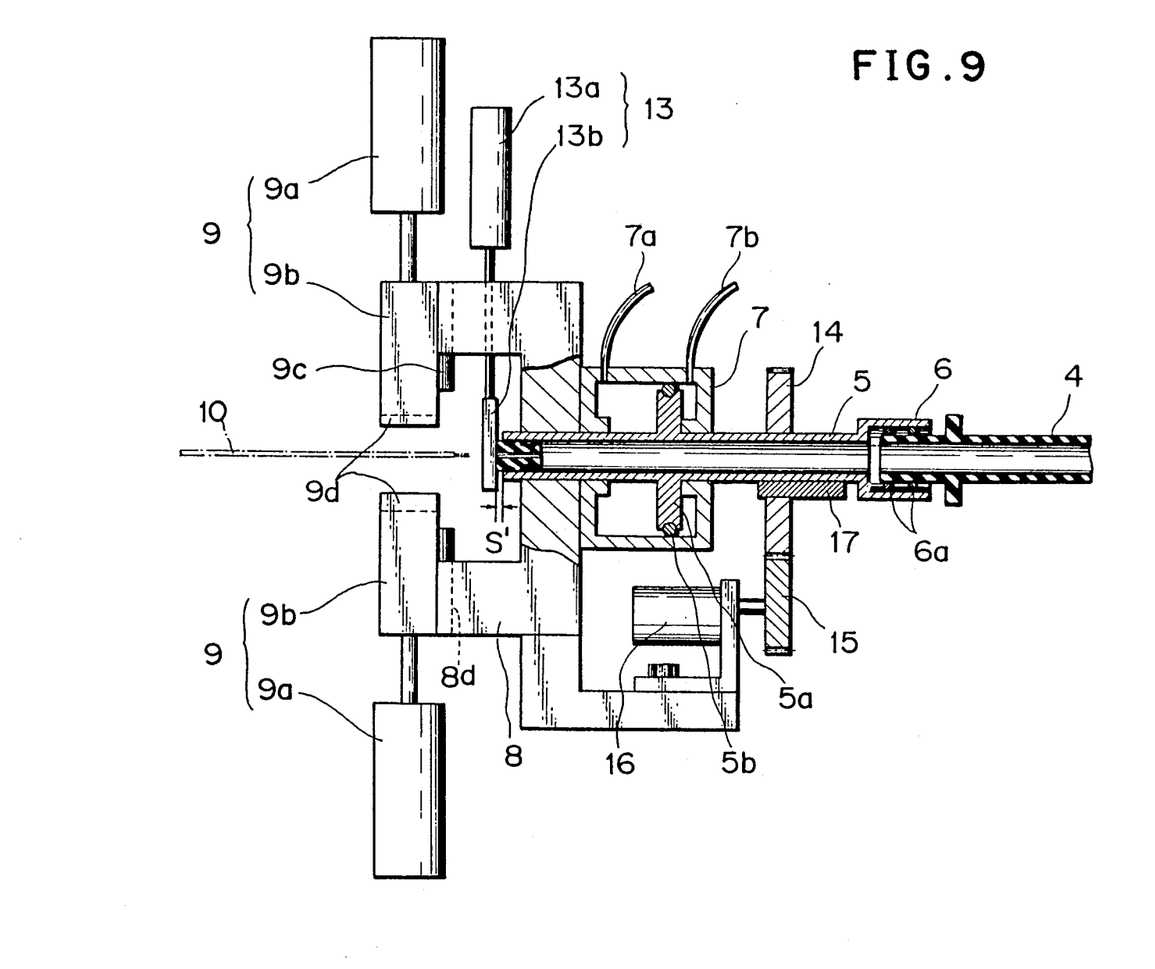
FIG. 9 is a partially cut-away view of a principal portion of the apparatus illustrated in FIG. 6, in the presence of a waterproof plug stopping means and with the guide nozzle in the retreated position.
Figure 10:
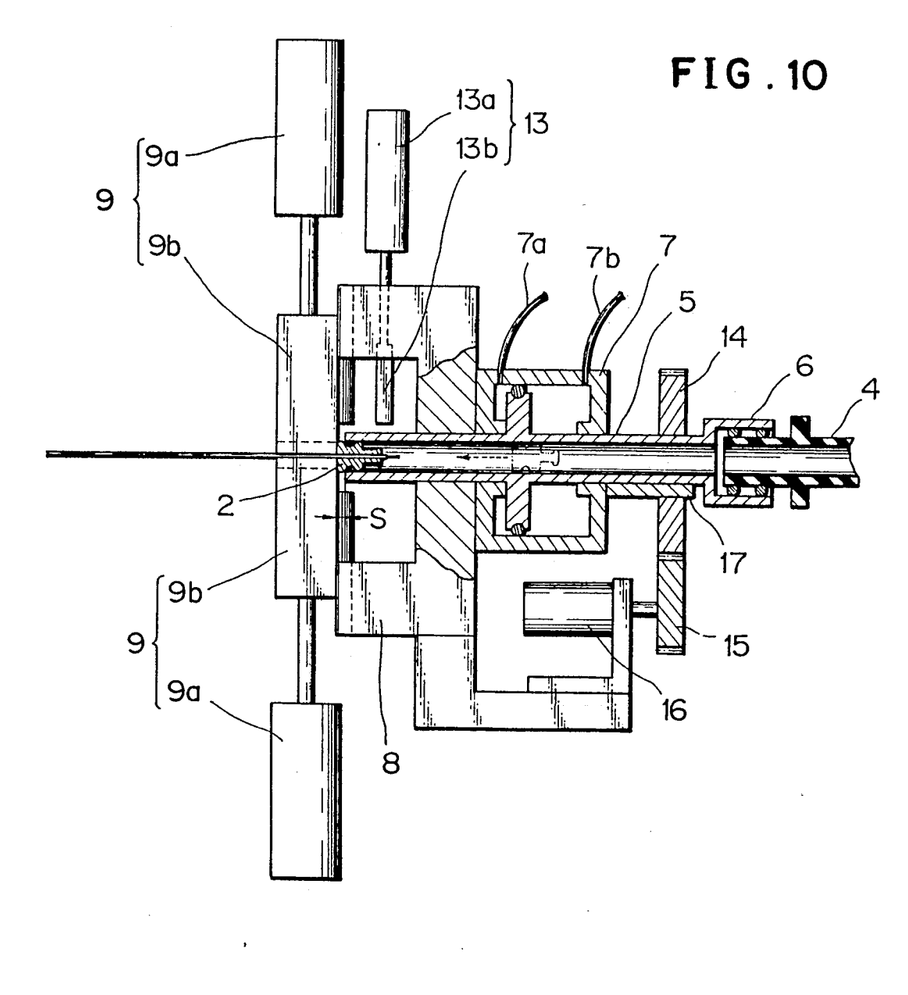
FIG. 10 is a view similar to FIG. 9, with the guide nozzle in the advanced position.

Referring now to FIGS. 9 and 10, there is illustrated an embodiment wherein a waterproof plug stopping means 13 is provided in front of the guide nozzle 5. The waterproof plug stopping means 13 comprises a cylinder 13a and a shutter 13b attached to the rod of the cylinder 13a. The shutter 13b can be moved back and forth by the cylinder 13a from a position in which it blocks the advancing path of the guide nozzle 5 up to a position in which it opens the said path. The shutter 13b of the waterproof stopping means 13 is plate-like, but its shape is not specially limited if only the shutter can stop the waterproof plug 2.

Where the waterproof plug stopping means 13 is provided, the air transfer device 4 is given a function which permits change-over between a high pressure (about 4 kgf/cm$^2$) and a low pressure (about 1 kgf/cm$^2$) as necessary. High-pressure air is used for the transfer and mounting of the waterproof plug 2, while low-pressure air is used to support the waterproof plug 2 with a light force to thereby prevent retreating of the plug.

The operation of the waterproof plug stopping means 13, if any, will now be explained with reference to FIGS. 9 and 10. First, in the state of FIG. 3, the electric wire 10 is gripped by the linear body gripping means 9 like the previous embodiment. The shutter 13b of the waterproof plug stopping means 13 is located at the open end of the guide nozzle 5 and blocks the advancing path of the guide nozzle providing a slight gap S' for the escape of air is formed between the shutter 13b and the guide nozzle 5.

On the other hand, one waterproof plug 2 fed from the waterproof plug feed means 1 is delivered to the air transfer device 4 through the waterproof plug dispenser 3, whereupon a high-pressure air is fed to the air transfer device 4, so that the waterproof plug 2 flies through the air transfer device and the guide nozzle 5 until abutment with the shutter 13b and stops temporarily. Upon abutment a changeover is made to a low-pressure air.

Then, the shutter 13b of the waterproof plug stopping means 13 moves back and a high-pressure air is fed to the guide nozzle actuating cylinder 7 through the air pipe 7b, so that the guide nozzle 5 advances toward the electric wire 10 until the front end of the wire enters the guide nozzle.

Almost simultaneously with the forward movement of the guide nozzle 5, the motor 16 is supplied with electricity, so that the gear 14 is rotated by the gear 15 and the guide nozzle 5 advances while rotating as previously noted. At this time, the waterproof plug 5 is pushed by the front end of the electric wire 10, but is pushed by the low-pressure air from the opposite side and is rotating with the rotation of the guide nozzle 5. Therefore, the waterproof plug 2 does not wholly move back the pushed length, but moves back to the extent that the front end of the electric wire 10 somewhat enters the hole 2c of the plug. Thereafter, the air pressure again becomes high and the waterproof plug 2 is given rotation by the guide nozzle 5 and is fitted on the front end portion of the electric wire as shown in FIG. 10. The rotation of the guide nozzle 5 may be started earlier, for example, at the same time when the waterproof plug 2 is delivered with high-pressure air by the air transfer device 4.

According to the embodiment illustrated in FIGS. 9 and 10, since the waterproof plug 2 is once stopped by the waterproof plug stopping means 13, even if it has been conveyed in a bent posture, the posture is corrected there in a natural manner and is fitted on the electric wire 10 in an straight posture. Further, such temporary stop of the waterproof plug 2 makes it possible to impart the rotation of the guide nozzle 100% to the waterproof plug, so that the plug can be fitted on the wire more effectively than in the embodiment of FIG. 6 and hence the mounting accuracy is further improved.

Figure 11:
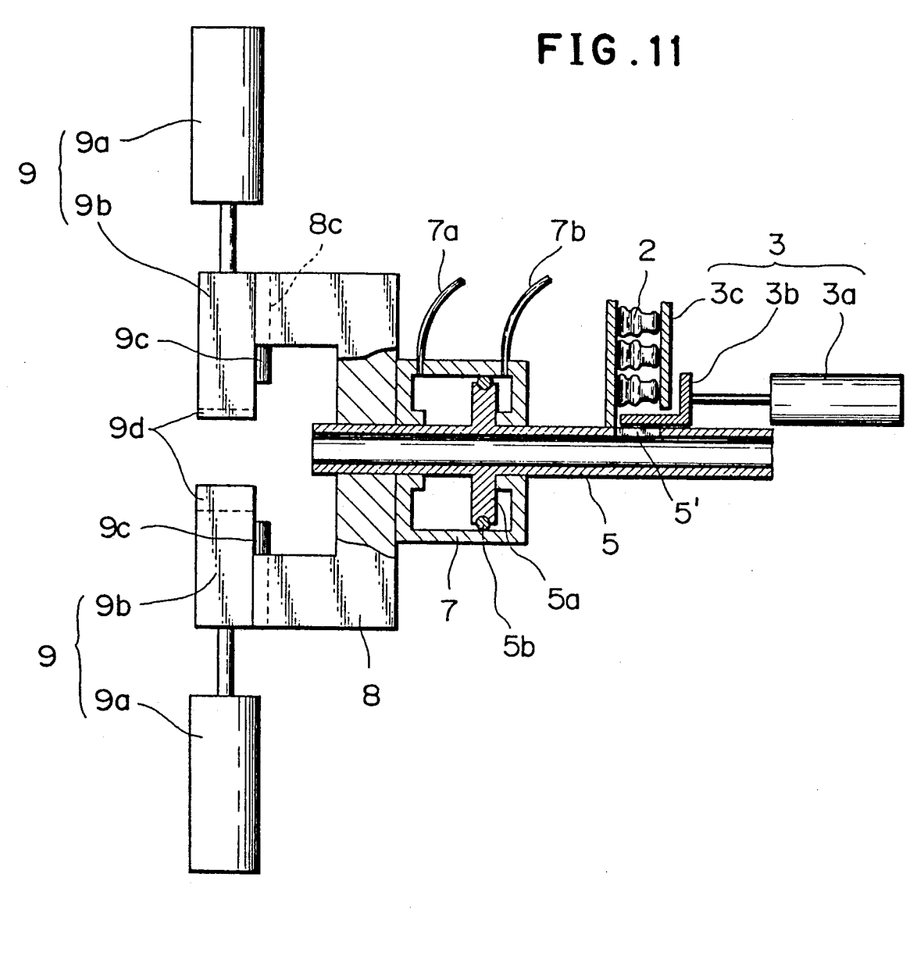
FIG. 11 is a partially cut-away view of a further embodiment wherein a waterproof plug delivery means 3 is connected directly to a guide nozzle 5.

Referring now to FIG. 11, there is illustrated a further embodiment of the invention wherein a waterproof plug dispenser 3 is connected directly to the guide nozzle 5. The waterproof plug dispenser 3 comprises a cylinder 3a, a partition plate 3b and a magazine 3c. The cylinder 3a and the partition plate 3b are the same as in the previous embodiment. A plurality of waterproof plugs 2 are stacked in the magazine in a state that each axis of the plugs is horizontal. The magazine 3c is connected at one end thereof to a hole 5' formed in a side part of the guide nozzle 5, while the other end thereof extends upwards in the figure and is connected to a waterproof plug feed means 1 such as a parts feeder. The waterproof plug dispenser 3 is fixed so that it can move forward and backward with like movements of the guide nozzle 5. The rear end (righthand side in the figure) of the guide nozzle 5 is connected to an air feed means such as a compressor. According to this embodiment, since the conveyance distance of the waterproof plug 2 is short, the mounting accuracy is improved and the entire apparatus is easy to be united, thus facilitating mounting and maintenance. The construction of the embodiment of FIG. 11 is applicable directly to all of the embodiments described above. Particularly, where the guide nozzle 5 shown in FIG. 6 rotates, the construction in question is applicable if the rotation of the guide nozzle is stopped always in the same manner.

Figure 13:
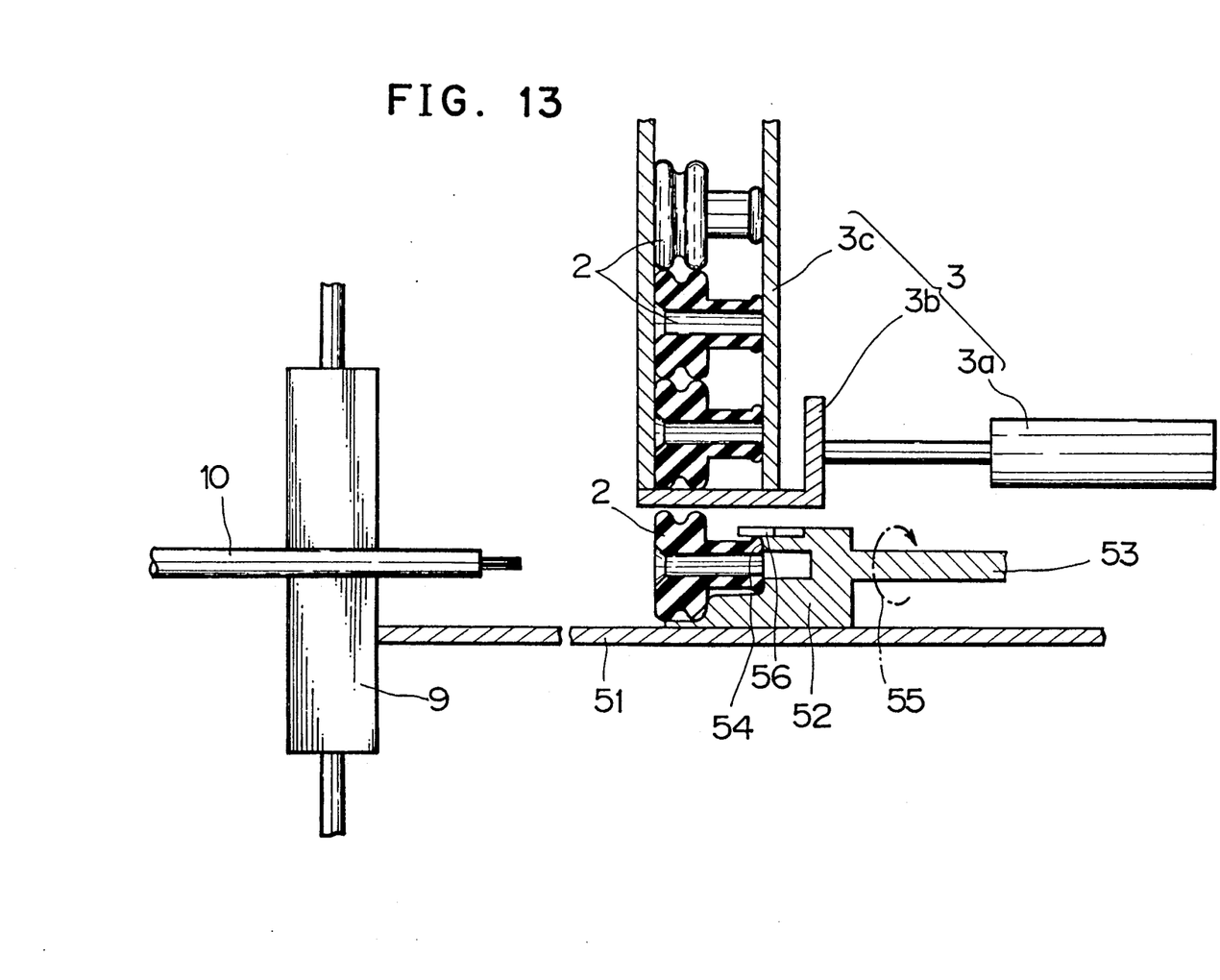
FIG. 13 is a sectional view of a still further embodiment of the present, invention.

Referring to FIG. 13, there is illustrated a still further embodiment wherein the waterproof plug dispenser 3 of the present invention shown in FIG. 11 is applied to a prior art apparatus as shown in FIG. 14. A transfer table 51 is illustrated with an intermittent portion cut out and deleted. A waterproof plug transfer member 52 is slidably moved on the table 51 by a pusher 53 until a linear body gripping means 9 grips an electric wire 10. The dispenser 3 holds a plurality of waterproof plugs 2 which are stacked vertically in a state that each axis of the plugs is positioned horizontally and parallel to the direction for transferring plugs on the transfer table 51. When the bottom of the magazine 3c is opened by replacement of a partition plate 3b moved by a cylinder 3a, a plug 2 drops and is received by a cavity 54 having a shape depending upon the profile of waterproof plug, the cavity being provided at the left and lower portion of the plug transfer member 52. If desired, the transfer member 52 of a cylindrical shape is rotated, as is so in some of the above-mentioned embodiments, by the pusher 53 which serves as a rotary shaft (see dots-and-dashes line 55), and in this case the upper surface of the transfer table has preferably a concave shape whose lateral section is arcuate. The transfer table 51 may be omitted if the transfer member 52 adequately fills the role solely by itself. Then in order to avoid the removal of the plug 2 from the transfer member 52 by the centrifugal force due to the rotation, for example a pin 56 is provided in the upper portion of the transfer member 52 in a state it is spring-loaded and normally protruded in the transfer direction. The pin 56 may be retreated from the vertical trajectory of the plug when the partition plate 3b is moved to open the bottom of the magazine 3c.

As set forth hereinabove, the following effects are attained by the present invention.

1 Since the apparatus is scarcely required to move until mounting of the waterproof plug, it becomes possible to effect a high speed operation, leading to cost reductions.

2 Since there is no displacement step from the delivery of the waterproof plug until mounting thereof on the front end of a linear body, the waterproof plug mounting rate is improved.

3 Since the waterproof plug is mounted on a linear body while the plug is rotated, it can be mounted straight in a corrected state even when the front end of the linear body is somewhat expanded and hangs down, whereby the mounting rate is further improved.

4 If the waterproof plug dispenser is connected directly to the guide nozzle, not only the mounting accuracy is improved but also the entire apparatus is provided as a united body, thus facilitating mounting and maintenance.

5 The use of the waterproof plug stopping means permits correction of the posture of the waterproof plug which has been changed during air conveyance, and thus the mounting accuracy is further improved.

6 By using the waterproof plug stopping means, the waterproof plug is stopped temporarily and is given 100% of the rotation of the guide nozzle, thus permitting the waterproof nozzle to be mounted on a linear body effectively.

7 Since the apparatus body and the waterproof plug feed means are connected together through an air transfer device, there is versatility in the arrangement and it is easy to layout for industrial application.

What is claimed is:

1. A method for mounting a waterproof plug to the front end of a covered electric wire, comprising the steps of:

feeding waterproof plugs to a first position of a transfer path one by one from a magazine in such a manner that the opening of each waterproof plug is maintained parallel with said transfer path as each waterproof plug is fed to said first position;

feeding a covered electric wire to a mounting position at a second position of said transfer path in an uncovered state of the front end thereof; and transferring the waterproof plug from the first position to the second position and inserting the uncovered end of the electric wire into the opening of the waterproof plug.

2. A method according to claim 1, wherein said transfer path is a gas transfer path, and in the step of feeding the uncovered end of the covered electric wire to the second position, said uncovered end is inserted into a guide nozzle.

3. A method according to claim 2, further including the step of rotating each waterproof plug in said transfer path.

4. A method according to claim 3, wherein said waterproof plugs are fed to said first position internally of a transfer pipe and including the step of rotating said transfer pipe about an axis thereof to rotate each waterproof plug.

5. A method according to claim 3 or claim 4, wherein the rotating force is given to the waterproof plug by a spiral groove formed in the inner wall of said transfer pipe.

6. A method according to claim 2, further including feeding said waterproof plugs internally of a transfer pipe to said first position and stopping each waterproof plug by a stopping means at an outlet end of said transfer pipe.

7. A method according to claim 6, further including the steps of withdrawing said stopping means at said outlet end of said transfer pipe and reducing the internal pressure of said transfer pipe to a low pressure when said stopping means is withdrawn from said transfer pipe after stopping of the waterproof plug.

8. A method according to claim 1, wherein the waterproof plug is received by a transfer rod at the first position and then transferred to the second position.

9. A method according to claim 8, wherein said transfer rod is rotated to rotate the waterproof plug.

10. A method according to claim 9, wherein the waterproof plug is rotated when it has reached or approached the second position.

11. An apparatus for mounting a waterproof plug to the front end of a covered electric wire, including:
   means for feeding waterproof plugs to a first position of a transfer path one by one in such a manner that the opening of each waterproof plug is maintained parallel with said transfer path as each waterproof plug is fed to said first position;
   means for feeding a covered electric wire to a mounting position at a second position of said transfer path in an uncovered state of the front end thereof; and
   means for transferring each waterproof plug from the first position to the second position and inserting and clamping the uncovered end of the electric wire into the opening of the waterproof plug.

12. An apparatus according to claim 11, wherein said transfer path includes an air transfer type tubular member.

13. An apparatus according to claim 12, including means for rotating at least one end of said transfer type tubular member.

14. An apparatus according to claim 12 or claim 13, wherein a discharge end of said air transfer type tubular member is opened and closed by a waterproof plug stopping means.

15. An apparatus according to claim 12 wherein at least part of said air transfer type tubular member is a flexible hose.

16. An apparatus according to claim 12 wherein said air transfer type tubular member has a spiral groove formed in the inner wall thereof for rotating the waterproof plug.

17. An apparatus according to claim 11, wherein a transfer rod reciprocates from the first to the second position of s id transfer path.

18. An apparatus according to claim 17, wherein said transfer path has a horizontal guide surface and said transfer rod is a pusher.

19. An apparatus according to claim 17, wherein said transfer rod has a waterproof plug receiving portion at the front end thereof.

* * * * *